United States Patent

Hilberath et al.

[15] 3,690,550

[45] Sept. 12, 1972

[54] PROCESS FOR TRANSPORTING THERMAL ENERGY

[72] Inventors: Friedrich Hilberath, Hans Teggers, both of D 5047 Wesseling near Cologne, Germany

[73] Assignee: Union Reinische Braunkohlen Kraftstoff Aktiengesellschaft, Wesseling near Cologne, Germany

[22] Filed: Dec. 27, 1968

[21] Appl. No.: 787,334

[30] Foreign Application Priority Data

Jan. 16, 1968  Germany..........P 16 92 253.5

[52] U.S. Cl. ......................237/81, 48/197, 176/39, 176/92
[51] Int. Cl...............................................F24d 7/00
[58] Field of Search .........................165/1; 237/1, 81

[56] References Cited

UNITED STATES PATENTS 3,558,047  1/1971  Wolfgang et al.............237/12

Primary Examiner—Edward J. Michael
Attorney—Connolly & Hutz

[57] ABSTRACT

Process for transporting thermal energy from the place where it is produced to the place where it is required for use by catalytic reforming of methane or natural gas, transporting the thus obtained gas mixture after cooling through pipe lines to the place where the energy is required for use, catalytically methanizing the gas mixture into methane and utilizing the heat liberated during this reaction in the manner required.

6 Claims, 1 Drawing Figure 3,690,550
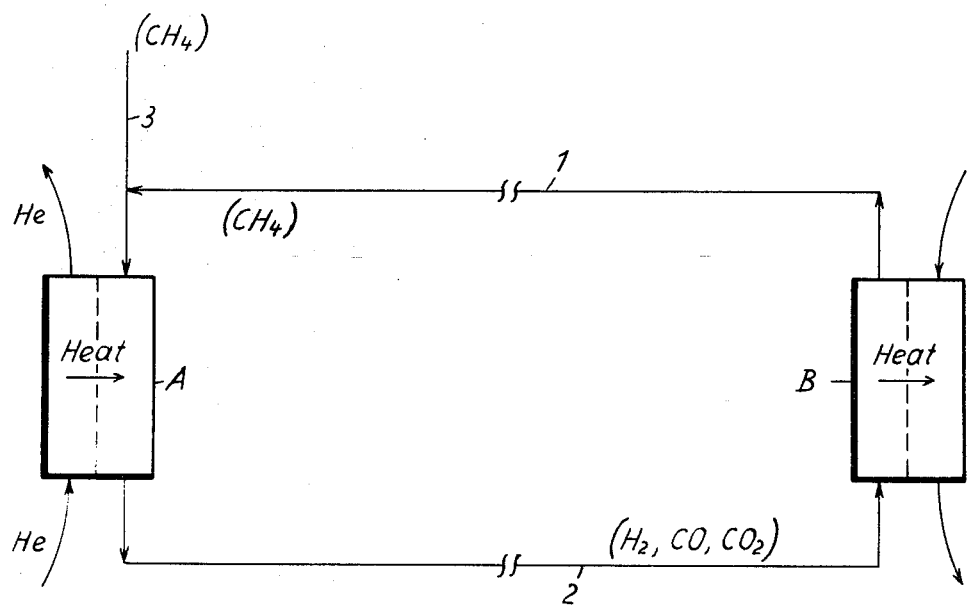
INVENTORS
*Friedrich Hilberath*
*Hans Teggers*
BY *Connolly and Hutz*
ATTORNEYS

PROCESS FOR TRANSPORTING THERMAL ENERGY

FIELD OF INVENTION

This invention relates to a process for transporting thermal energy.

DESCRIPTION OF PRIOR ART

Various methods have been adopted for transporting thermal energy from places where it is generated in any form to where it is required for use. In spatially restricted areas, for example in towns or industrial complexes, thermal energy may be directly transported by piping heated liquid, for example water, diphenyl, or steam, through pipe lines to the site where the heat is required for use. This system inevitably involves losses of energy, for example through the dissipation of heat to the area surrounding the pipe lines. Accordingly, the direct transportation of heat by this system is limited to short distances. In addition this transport system can only be economically applied with low temperature heat at about 100° to 500° C. It would be too expensive to carry high temperature heat in this way. In addition, nobody has yet produced any heat-transfer agents that can be used for temperatures in excess of about 500° C. Accordingly, the thermal energy is usually converted in power stations into electrical energy, which is carried through metal conductors to the site where the energy is required for use. Unfortunately, substantial losses are involved in the conversion of heat into electricity due to the differences between the efficiency levels of the individual process stages.

SUMMARY OF INVENTION

It has now been found that heat can be transported with advantage from the site where it is generated to the site where it is required for use, by using the heat generated for the catalytic reforming of methane, transporting the resulting gas after it has been cooled through pipe lines to the site where the energy is required for use, catalytically methanizing the gas and exploiting the heat thereby liberated in the manner required. It is thus possible to utilize the thermal energy as such at the place where it is required.

DETAILED DESCRIPTION OF INVENTION

The methane used may be recycled to the reforming plant, although it may of course also be used for another purpose, for example in chemical reactions or optionally for example in partial combustion.

The process of the present invention may be applied with particular advantage when high temperature heat has to be carried over considerable distances. Heat of this kind is generated, for example, in nuclear reactors. It may also be produced, for example, through the combustion of inexpensive fuels. Natural heat sources may also be used. Instead of pure methane, is is also possible to use gases containing methane, such as natural gas. The concentration of inert constituents, or other hydrocarbons, or other compounds should not be too high if the methane is to be recycled, in order to prevent excessively high losses through dilution or through secondary reactions.

The methane may be reformed and the gases thus obtained may be methanized by any process known per se. One standard process for example is steam reforming, using nickel catalysts at about 700° C, and can be carried out at atmospheric pressure or at elevated pressure. Known methanization processes operate, for example, with nickel or noble metal catalysts. When these processes known per se are used, precautions must of course be taken to ensure the absence of harmful compounds in the gases.

The process according to the invention enables thermal energy to be carried with advantage over long distances and to be re-used as such. It is of advantage that more than 85 percent of the thermal energy which is released or used in the reforming of methane can be recovered at the place where the methanization reaction is carried out. Any heat energy losses that occur are attributable solely to radiation losses in the reforming plant and the methanization plant, and to the incompleteness of heat exchange between the incoming and outgoing gases.

The process is described in the following, with reference to the accompanying drawing which is a schematic representation of the process, but the invention is not restricted to the particular arrangement shown or to the Example. No attempt will be made to describe in detail any of the process stages which are known per se, such as heat exchange or cooling.

Referring now to the Drawing, the complex A comprises an installation for releasing heat from the helium circuit of a nuclear reactor and a methane steam-reforming plant is energized by this heat. Methane is introduced through pipe 1 into this plant. The methane is converted gas mixture consisting of hydrogen, carbon monoxide and carbon dioxide in accordance with the reactions $$CH_4 + H_2O = CO + 3H_2 \text{ and}$$

$$CH_4 + 2H_2O = CO_2 + 4H_2.$$

Only a small portion of the methane is left unreacted, depending on the equilibrium of the pressure and temperature conditions selected. It is of particular advantage that no harmful secondary products are formed, which for example could poison the catalyst through deposits or are withheld from the reaction. The stoichiometric ratios between the components hydrogen, carbon monoxide and carbon dioxide remain intact as they do in the inverse reaction of such an equilibrium. The gas mixture obtained in the reforming plant is conducted to the site where the thermal energy is to be used through pipe 2, to complex B. At complex B, which comprises the installations for methanizing the reforming gas and for utilizing the heat obtained during this exothermic reaction, the components carbon monoxide and carbon dioxide are converted back into methane. The methane is recycled to the reforming plant through pipe 1. If the methane obtained in B is used for chemical reactions, for example, a corresponding quantity of methane is added to the circuit through pipe 3. Depending upon the course of the reaction, from 42 to 50 kcal. of heat can be brought to B per mol of methane reformed. In other words, large quantities of heat can be carried from A to B given a corresponding methane through-put. Since the reaction system proposed here is carried out in a closed circuit, the losses of gas components are small. They only comprise leaks and the dissolved gases in the water of reaction which is removed after the methanization stage in complex B.

The catalysts commonly used for the reforming and methanization reactions have a long service life and are resistant to abrasion. Reforming may also be carried out, for example, in the presence of carbon dioxide.

EXAMPLE

In this particular instance, the heat to be transported comes from a helium gas circulating in a high temperature reactor at about 1,000° C. The heat is removed from the helium circuit by causing the hot helium to flow directly around the catalyst-filled pipes of the methane reforming plant. Reforming was carried out in the usual way by adding 3 mols of steam per mol of methane, at about 900° C. and 55 atms. After condensing out the excess steam, followed by cooling, the resulting gas was delivered through a pipe line, compressed to about 70 atms. pressure, to the methanization site, i.e., where the heat is required for use. Methanization of the reforming gas was carried out in the usual way at about 300° C. over one of the conventional methanization catalysts. The resulting methane was recycled through another pipe to the methane reforming plant. In the case of a transport of 1 million $Nm^3/h$ of methane through a pipe line of a length of 100 km, the cost per unit of heat at the consumption site amounts to only about 65 percent of the costs which would be involved if the heat were to be converted in a steam power plant and transported in the usual way in form of electrical current.

What is claimed is:

1. A process for delivering thermal energy a geographical distance from a supply of such energy, which process comprises using the supplied energy to reform methane with water and thus produce a gaseous mixture of hydrogen and oxides of carbon, transporting such gaseous mixture to the delivery location, and methanizing the mixture at that location to generate thermal energy and regenerate the methane.

2. The process of claim 1 in which the methane reformed is in a stream of natural gas.

3. The process of claim 1 in which at least some of the regenerated methane is recycled back to the energy supply.

4. The process of claim 1 in which the energy supply is a nuclear reactor.

5. The process of claim 1 in which the energy supply is a fuel burner.

6. The process of claim 1 in which the transporting of the gaseous mixture to the delivery location is effected with such mixture under superatmospheric pressure.

* * * * *